United States Patent [19]

Jones et al.

[11] 4,126,549

[45] Nov. 21, 1978

[54] TREATMENT OF WATER

[75] Inventors: Thomas I. Jones, Poynton; Geoffrey Graham, Cheadle; Michael A. Finan, Macclesfield, all of England

[73] Assignee: Ciba-Geigy (UK) Limited, London, England

[21] Appl. No.: 811,658

[22] Filed: Jun. 30, 1977

Related U.S. Application Data

[63] Continuation-in-part of Ser. No. 717,728, Aug. 24, 1976, abandoned, which is a continuation of Ser. No. 614,102, Sep. 17, 1975, abandoned, which is a continuation of Ser. No. 442,547, Feb. 14, 1974, abandoned.

[30] Foreign Application Priority Data

Feb. 14, 1973 [GB] United Kingdom .................. 7181/73

[51] Int. Cl.$^2$ ............................................. C02B 5/06
[52] U.S. Cl. .................................. 210/58; 252/8.55 E; 252/180; 252/388; 526/15; 526/272; 422/16
[58] Field of Search .................. 203/7; 210/54, 58; 252/180, 181, 8.55 E, 388, 389 R, 390; 526/15, 47, 49, 271, 272; 21/2.7 R

[56] References Cited

U.S. PATENT DOCUMENTS

| | | | |
|---|---|---|---|
| 2,723,956 | 11/1955 | Johnson | 210/58 |
| 3,558,570 | 1/1971 | Rinno | 526/272 |
| 3,617,577 | 11/1971 | King | 210/58 |
| 3,684,779 | 8/1972 | Rapko | 210/58 |
| 3,715,307 | 2/1973 | Johnson et al. | 210/58 |
| 3,755,264 | 8/1973 | Testa | 210/58 |
| 3,810,834 | 5/1974 | Jones et al. | 210/58 |
| 4,065,607 | 12/1977 | Kurowsky | 210/58 |

FOREIGN PATENT DOCUMENTS

| | | | |
|---|---|---|---|
| 772,775 | 4/1957 | United Kingdom | 210/58 |
| 1,414,918 | 11/1971 | United Kingdom | 210/58 |

*Primary Examiner*—Thomas G. Wyse
*Assistant Examiner*—Peter A. Hruskoci
*Attorney, Agent, or Firm*—Luther A. R. Hall

[57] ABSTRACT

A process for the prevention of scale and the inhibition of corrosion which comprises adding to water a hydrolyzed terpolymer of maleic anhydride with vinyl acetate and ethyl acrylate, the molar ratio of maleic anhydride to the other monomers being from 2.5:1 to 5:1, the ratio of vinyl acetate to ethyl acrylate being 1:1 to 2:1, and the molecular weight of the terpolymer being below 1000.

9 Claims, No Drawings

TREATMENT OF WATER

This is a continuation-in-part application of application, Ser. No. 717,728, filed Aug. 24, 1976, now abandoned which in turn is a continuation of application, Ser. No. 614,102, filed Sept. 17, 1975, now abandoned, which in turn was a continuation of application, Ser. No. 442,547, filed Feb. 14, 1974, now abandoned.

BACKGROUND OF THE INVENTION

The present invention relates to a method of treating water in order to prevent the formation of calcium and magnesium salt deposits on the surfaces of pipes, boilers, evaporators, steam ejectors and the like as well as providing protection of metal surfaces against corrosion at ambient temperatures. The present invention also pertains to the prevention of barium sulphate scale formation in oil well drilling operations.

This prevention of scale and inhibition of corrosion are attained by adding to water a hydrolyzed terpolymer of maleic anhydride with vinyl acetate and a third monomer, preferably ethyl acrylate.

Various proposals have been made for the use of polymaleic anhydride and copolymers thereof in water treatment processes. For example, U.S. Pat. No. 3,617,577 describes the use of copolymers of maleic anhydride and ethylene with molecular weights of from about 1000 to 5000, and states that with polymers of lower molecular weight no substantial inhibition of scale depositon is achieved at threshold concentrations.

U.S. Pat. No. 2,723,956 describes the use of copolymers of maleic anhydride and another monoethylenic compound in a molar ratio of 1:2 to 2:1 for the reduction and prevention of scale formation, but the molecular weights are not disclosed. U.K. patent specification No. 772,775 describes a process for treating hard water with water soluble copolymers of maleic anhydride and other monomers, having molecular weights of from 1000 to 40000.

U.S. Pat. No. 3,558,570 discloses the preparation of telomers of styrene and maleic anhydride having a molecular weight under 2500.

U.S. Pat. No. 3,684,779 describes terpolymers of maleic monomers (such as maleic anhydride), acrylic monomers (such as acrylic acid) and alkenyl phosphonate monomers (such as diethyl vinylphosphonate) having a molecular weight between 5000 and 50000 which are sequestering or chelating agents useful in preventing scale formation.

U.S. Pat. No. 3,810,834 pertains to the use of hydrolyzed homopolymers of maleic anhydride as a water treatment to prevent scale formation or to modify said scale to facilitate its removal. The hydrolyzed homopolymer has a molecular weight between 300 to 5000. This product is particularly useful in preventing calcium carbonate and other alkali metal or alkaline earth metal carbonate scale.

U.S. Pat. No. 3,715,307 describes 1:1 mole ratio copolymers of maleic anhydride and selected vinyl monomers, particularly vinyl acetate. These copolymers are suitable as water conditioners to reduce maintenance problems associated with using sea water in heat transfer equipment.

U.S. Pat. No. 3,755,264 pertains to copolymers (and the hydrolyzed analogues thereof) of maleic anhydride (85 to 99 mol percent) with acrylic acid, vinyl acetate, styrene or mixtures thereof (15 to 1, preferably 15 to 5 mol percent) which are useful as scale inhibitors in water systems. The copolymers have a molecular weight of at least 300. While these copolymers are effective in preventing scale deposition of the carbonate type, they are relatively ineffective against sulphate scale unlike the hydrolyzed terpolymers of the present invention which are very effective against sulphate.

SUMMARY OF THE INVENTION

The present invention pertains to a method of prevention of scale and the inhibition of corrosion in aqueous systems by the use of low molecular weight hydrolyzed terpolymer of maleic anhydride with two other ethylenically unsaturated monomers, preferably vinyl acetate and ethyl acrylate.

The use of such terpolymers at very low concentrations in water prevents the build-up of alkaline earth sulphates as well as carbonates in heat transfer equipment, boilers, oil well drilling operations and the like.

DETAILED DESCRIPTION

We have now surprisingly found that water-soluble, hydrolyzed copolymers of maleic anhydride and other monomers having an average molecular weight of below 1000, as determined by vapour phase osmometry using methyl ethyl ketone as solvent, and a molar ratio of maleic anhydride to monoolefinic compound of from 2.5:1 to 100:1, exhibit a threshold activity towards calcium carbonate and in certain cases also towards calcium sulphate.

According to the present invention, therefore, there is provided a process for treating water which comprises adding thereto a hydrolyzed copolymer of maleic anhydride with a mono-ethylenically unsaturated monomer or a mixture of monomers, the molar ratio of maleic anhydride to other monomers being from 2.5:1 to 100:1 preferably from 2.5:1 to 30:1 and more preferably 2.5:1 to 7:1, and most preferably 2.5:1 to 5:1 the molecular weight of the copolymer being in the range of below 1000. They may also be used in conjunction with other water treatment compounds well known in the art. Dispersing and/or threshold agents may be used, such as for example polyacrylic acid and its salts, hydrolyzed polyacrylonitrile, polymethacrylic acid and its salts, polyacrylamide and co-polymers thereof from acrylic and methacrylic acids, lignin sulphonic and its salts, tannin, naphthalene sulphonic acid/formaldehyde condensation products, starch and its derivatives, and cellulose derivatives, e.g., carboxymethyl cellulose. Specific threshold agents such as for example, polymaleic acid and its salts, alkyl phosphonic acids, 1-aminoalkyl 1,1-diphosphonic acids and their salts and alkali metal phosphates, may also be used.

The copolymers may also be used in combination with precipitating agents such as alkali metal orthophosphates, carbonates and hydroxides, oxygen scavengers such as alkali metal sulphites and hydrazine and sequestering agents such as nitrilotriacetic acid and their salts and ethylenediamine tetraacetic acid and its salts. They may also be used in conjunction with corrosion inhibitors such as cyclohexylamine, morpholine, distearylamine/ethylene oxide condensation products, stearylamine, sodium sulphate, magnesium sulphate and also in conjunction with antifoaming agents such as distearyl sebacamide, distearyl adipamide and related products derived from ethylene oxide condensations, in addition to fatty alcohols and their ethylene oxide condensates.

The ethylenically unsaturated monomers can be selected from a wide range of compounds, for example, acrylic acid, methacrylic acid, crotonic acid, itaconic acid, aconitic acid (and their esters), ethyl acrylate, methyl methacrylate, acrylonitrile, acrylamide, vinyl acetate, styrene, α-methylstyrene, methyl vinyl ketone, acrolein, ethylene, propylene or mixtures thereof.

When mixtures of monomers are used, the resulting polymer may be, e.g., a terpolymer derived from maleic anhydride and two other monomers. Such terpolymers are, for example, those derived from maleic anhydride, vinyl acetate and ethyl acrylate. Other suitable combinations may also be used as shown in the Table below:

Particularly preferred copolymers are those derived from hydrolyzed copolymers of maleic anhydride and acrylic acid, its amide and its esters, methacrylic acid, its amide and its esters and vinyl esters.

The instant invention particularly pertains to a process for the prevention of the deposition of scale from water caused by scale forming materials in the water and the inhibition of corrosion which comprises adding to water 0.1 to 100 parts per million by weight of a hydrolyzed terpolymer of maleic anhydride with two ethylenically unsaturated monomers selected from the group consisting of acrylic acid, methacrylic acid, crotonic acid, itaconic acid, aconitric acid, ethyl acrylate, methyl methacrylate, other esters of said acids, acrylonitrile, acrylamide, vinyl acetate, styrene, α-methylstryrene, methyl vinyl ketone, acrolein, ethylene and propylene, the molar ratio of maleic anhyride to the sum of the moles of the other two monomers being from 2.5:1 to 5:1, the molar ratio of the two monomers to each being from 1:1 to 2:1, and the molecular weight of the terpolymer, measured by vapor phase osmometry in methyl ethyl ketone solution, being in the range below 1000.

A preferred embodiment of the instant invention is invention is a process which comprises adding to water 0.1 to 100 parts per million by weight of a hydrolyzed terpolymer of maleic anhydride either with (a) vinyl acetate and another ethylenically unsaturated monomer selected from the group consisting of ethyl acrylate, acrylamide, methyl vinyl ketone, acrylonitrile and crotonic acid, wherein the molar ratio of vinyl acetate to the other monomer is 1:1 to 2:1, or with (b) a 1:1 molar ratio of methyl methacrylate and ethyl acrylate; or of methyl acrylate and acrolein, the molar ratio of maleic anhydride to the sum of the other two monomers being 2.5:1 to 5:1, and the molecular weight of the terpolymer being in the range below 1000.

An especially preferred embodiment of the instant invention is a process which comprises adding to water 0.1 to 100 parts per million by weight of a hydrolyzed terpolymer of maleic anhyride with vinyl acetate and ethyl acrylate, the molar ratio of maleic anhydride to the combined moles of vinyl acetate and ethyl acrylate being from 2.5:1 to 5:1, the molar ratio of vinyl acetate to ethyl acrylate being 1:1 to 2:1, and the molecular weight of the terpolymer being in the range below 1000.

As is seen in the Examples, the problem of coping with carbonate scale formation can be successfully addressed using a number of scale inhibitors. These include the hydrolyzed homopolymer of maleic anhydride (U.S. Pat. No. 3,810,834) and hydrolyzed copolymers of maleic anhydride with a variety of comonomers including vinyl acetate, styrene and acrylic acid (U.S. Pat. No. 3,755,264) and ethyl acrylate, acrylamide, methyl vinyl ketone, acrylonitrile, crotonic acid, methyl methacrylate, acrolein and methyl acrylate (present specification).

The problem of scale deposition associated with sulphate is quite a bit more intractable. The above named scale inhibitors are either inactive against sulphate or exhibit only marginal effectiveness against this important source of scale problems (sulphate).

Surprisingly, hydrolyzed terpolymers of maleic anhydride with two other ethylenically unsaturated monomers exhibited excellent scale inhibition activity against sulphate.

The hydrolyzed terpolymer of maleic anhydride/vinyl acetate/ethyl acrylate exhibited especially effective scale inhibition activity against sulphate. However, hydrolyzed terpolymers of maleic anhydride/vinyl acetate/third comonomer or hydrolyzed terpolymers of maleic anhydride with two ethylenically unsaturated comonomers selected from the group listed above also exhibit substantially similar scale inhibition activity against sulphate.

The hydrolyzed terpolymers of the instant invention provide a solution to a long sought need not available from the prior art materials.

While problems with scale formation are most commonly associated with calcium and magnesium carbonates and sulphates, serious scale difficulties are also encountered in oil well drilling operations where barium sulphate is of concern. The preferred terpolymers of this invention are very effective in preventing scale deposition and corrosion associated with barium sulphate in oil well drilling operations.

The copolymers may be prepared in various ways. One convenient way is by polymerisation in a solvent, especially a reactive solvent using a free radical initiator such as benzoyl peroxide, di-tertiary butyl peroxide or monobutyl hydroperoxide. In some cases the polymer precipitates out of solution, but if, for example, methyl ethyl ketone is used as the solvent, it may remain in solution. It can then be isolated, e.g., by distillation of the methyl ethyl ketone followed by precipitation of the anhydride resin in a non-polar solvent such as toluene.

Examples of the reactive solvents that can be employed include xylene, toluene, ethylbenzene, acetone, methyl ethyl ketone, carbon tetrachloride, acetic acid and acetonitrile. Particularly preferred are xylene and toluene.

When a reactive solvent is used, it forms a minor portion of the polymer molecule. Such copolymers may be also termed cotelomers. Examples of copolymers which may be used in the present invention, and suitable reactive solvents which may be used in their preparation are given in the following table.

TABLE

| Moles of maleic anhydride | Moles of first co-monomer | Moles of second co-monomer | Solvent | Example No. |
|---|---|---|---|---|
| 2.5 | 0.5 ethyl acrylate | 0.5 vinyl acetate | toluene | |
| 9.0 | 1.0 ethyl acrylate | 2.0 vinyl acetate | xylene | 13 |

TABLE-continued

| Moles of maleic anhydride | Moles of first co-monomer | Moles of second co-monomer | Solvent | Example No. |
| --- | --- | --- | --- | --- |
| 10.0 | 1.0 ethyl acrylate | — | toluene | |
| 3.0 | 1.0 vinyl acetate | — | ethyl-benzene | 12 |
| 6.0 | 1.0 vinyl acetate | 1.0 ethyl acrylate | xylene | 14 |
| 29.0 | 1.0 vinyl acetate | — | toluene | 9 |
| 2.5 | 1.0 ethylene | — | toluene | |
| 2.5 | 1.0 propylene | — | xylene | |
| 3.0 | 0.5 methyl vinyl ketone | 0.5 vinyl acetate | | |
| 14.0 | 1.0 methyl vinyl ketone | — | toluene | 7 |
| 3.0 | 1.0 methyl methacrylate | — | toluene | 8 |
| 6.0 | 1.0 methyl methacrylate | 1.0 ethyl acrylate | xylene | |
| 3.0 | 0.5 acrylonitrile | 0.5 vinyl acetate | ethyl-benzene | |
| 3.0 | 0.5 acrolein | 0.5 methyl acrylate | methyl ethyl ketone | |
| 14.0 | 1.0 acrolein | — | toluene | 10 |
| 3.0 | 1.0 acrylamide | — | toluene | 6 |
| 9.0 | 1.0 acrylamide | 2.0 vinyl acetate | xylene | |
| 3.0 | 0.5 crotonic acid | 0.5 vinyl acetate | carbon tetrachloride | |
| 7.0 | 1.0 crotonic acid | — | toluene | 3 |
| 3.0 | 1.0 styrene | — | acetic acid | |
| 29.0 | 1.0 styrene | — | toluene | 5 |

The amount of initiator used can be varied over a wide range, but depends to some extent on the ratio of monomers. All the copolymers may be made using 20% or more by weight of initiator based on the weight of monomers, this amount being necessary for those copolymers containing high ratios of maleic anhydride to other monomers, e.g., 14:1, upwards, such as 29:1, if a high yield is desired. As the proportion of maleic anhydride is reduced, the amount of initiator may also be reduced without affecting the yield.

The reactants may be mixed in different ways, for example, the initiators may be added to a solution of the monomers, or else a solution of monomers and initiators may be added to heated solvent.

The final copolymer may be hydrolyzed before it is used to treat water. The hydrolysis may be carried out by means of water, an alkali or a mineral acid.

GENERAL PROCEDURE FOR PREPARATION OF COPOLYMERS

A general method which was used to prepare the homopolymer of the comparative example and the copolymers of Example 1 to 11 is as follows:

Two solutions were made up:

| | | |
| --- | --- | --- |
| Monomer solution | Maleic Anhydride plus Comonomer (s) | 30 parts by weight |
| | Toluene | 70 parts by weight |
| Initiator suspension | Benzoyl peroxide 70% paste in dimethyl phthalate | 8.6 parts by weight |
| | Toluene | 35 parts by weight |

The monomer solution was stirred and heated to 70° C. and the initiator solution added over 5 minutes. The solution was then refluxed at 110°–113° C. for 6 hours. After cooling, the precipitated resin was separated from the toluene solution and dried under vacuum. Yields were generally 70–90% based on weight of monomers.

The polymer was ground to a powder and boiled with water for an hour to hydrolyze the anhydride to the acid. In most cases, this rendered the polymer water soluble, but occasionally (e.g., with styrene/maleic anhydride 1:3) it was found necessary to add sodium hydroxide to dissolve the polymer.

The copolymers containing hydrolysable comonomers e.g., vinyl acetate, acrylonitrile, ethyl acrylate etc., were hydrolyzed further by taking a quantity of water-hydrolyzed polymer solution containing 1 gram of polymer and adding 25 mls of M NaOH. This was gently boiled in a beaker for 6 hours at the end of which time it was neutralized to pH 10 with M HCl.

The amount of hydrolyzed copolymer added to the water to be treated can vary over a wide range and may be from 0.1 to 100 parts per million by weight. Preferably the amount added is from 2 to 100 ppm, most preferably from 5 to 100 ppm.

As well as being useful for the prevention of scale and as corrosion inhibitors, the copolymers may also be used as detergent builders.

Procedures for testing the copolymers

The high activities of the preferred copolymers and terpolymers towards scale forming salts were demonstrated in an experimental boiler and in a sea water evaporator rig. These test methods are described in examples 12 and 14. Both are, however, lengthy procedures and in order to test the large number of polymers described in the examples, a simpler test was devised. The threshold activity tests described below can be completed in 2 hours and give very good indications of the activity of the compound under test towards boiler scale forming salts.

Threshold activity towards CaCO₃ (Test 1)

2 cm³ of a 1000 ppm solution of the scale inhibitor compound which is being tested, is mixed in a beaker with 100 cm³ of an aqueous solution containing 1.47 gm/litre Ca(NO₃)₂.4H₂O. 100 cm³ of an aqueous solution containing 0.646 gm/liter Na₂CO₃ are added and the beaker placed on a hot plate so adjusted that the solution is heated to 90° C. in 10 minutes. The solution is pumped through the colorimeter cell of an Auto Analyser and its optical density measured and continuously recorded on a chart.

From the chart of optical density vs. time two measurements are noted, (a) the initiation time (I.T.) defined as the time after mixing the two solutions at which precipitation occurs (as judged by an increase in optical density), and (b) the rate of precipitation defined as the maximum positive slope of the recorded track of optical density vs. time, disregarding any rapid short-term increases from the base line, of less than 15% of the optical density shown by a fully precipitated blank solution.

Threshold activity towards CaSO₄

The test is the same as that described above except that 1 cm³ of 1000 ppm solution of the scale inhibitor compound is added to 50 cm³ of an aqueous solution containing 20 gm/liter Ca(NO₃)₂.4H₂O and after mixing, 50 cm³ of an aqueous solution containing 17 gm/liter Na₂SO₄ are added.

In both the above tests only 10 ppm of scale inhibitor in the final test solutions is used.

The initiation times and rates for CaCO₃ and CaSO₄ precipitation in the absence of any additive are given in the tables in Examples 1–11.

An increase in initiation time or a decrease in the rate of precipitation in the presence of a test additive indicates that the additive has a retarding effect on the precipitation of the scale forming salts.

The procedures described above and in Examples 12 to 14 assess the activities of test compounds against scale forming salts at high temperatures. However, in some applications it is required to retard the deposition of scale, in particular of calcium sulphate, at ambient temperatures, i.e., 15°–30° C. A test procedure is described in Example 15 which demonstrates the effectiveness of the copolymers of the invention in delaying precipitation of CaSO₄.2H₂O at 20° C.

The invention is illustrated with reference to the following examples.

COMPARATIVE EXAMPLE

Maleic anhydride homopolymer

Three polymers were prepared for comparison purposes by the general method outlined above. The number average molecular weight of the first resin prepared was found to be 450. After hydrolysis with water, they were found to have the following threshold activities.

|  | CaCO₃ activity | | CaSO₄ activity | |
| --- | --- | --- | --- | --- |
|  | I.T. (mins) | Rate | I.T. (mins) | Rate |
| 1st Preparation | 7 | 0.4 | 3 | >30 |
| 2nd Preparation | 5 | 0.6 | 3 | >30 |
| 3rd Preparation | 5 | 0.6 | 3 | >30 |
| Blank (no polymer) | 1 | 8 | 3 | >30 |

Thus homopolymaleic acid has high activity towards CaCO₃, but no activity towards CaSO₄.

EXAMPLE 1

Maleic anhydride/acrylic acid copolymers

These are prepared as in the general method outlined above and hydrolyzed with water. The yields and number average molecular weights obtained are given below:

| Molar Ratio MA/ Acrylic Acid | Yield % | M. WT. |
| --- | --- | --- |
| 3:1 | 86 | 490 |
| 8:1 | 85 | 380 |
| 14:1 | 85 | — |
| 29:1 | 88 | — |

On threshold testing they were found to have the following activity:

|  | CaCO₃ activity | | CaSO₄ activity | |
| --- | --- | --- | --- | --- |
| Molar Ratio MA/AAc | I.T. (mins) | Rate | I.T. (mins) | Rate |
| 3:1 | 5 | 1.3 | 6 | >30 |
| 8:1 | 5 | 0.5 | 6 | >30 |
| 14:1 | 6 | 0.2 | — | — |
| 29:1 | 5 | 0.3 | — | — |
| Blank | 1 | 8 | 3 | >30 |

The maleic/acrylic acid copolymer, thus, has high CaCO₃ activity and slight activity towards CaSO₄.

EXAMPLE 2

Maleic anhydride/methacrylic acid copolymers

These were made according to the general method in yields of 80–90% and hydrolyzed with water. The 3:1 MA/MAAc copolymer had a molecular weight of 440. They had the following activities towards CaCO₃ and CaSO₄:

|  | CaCO₃ activity | | CaSO₄ activity | |
| --- | --- | --- | --- | --- |
| Molar Ratio MA/MAAc | I.T. (mins) | Rate | I.T. (mins) | Rate |
| 3:1 | 4 | 0.4 | 5 | >30 |
| 7:1 | 7 | 0.3 | 5 | >30 |
| 14:1 | 5 | 0.3 | 5 | >30 |
| 29:1 | 8 | 0.4 | 5 | >30 |
| Blank | 1 | 8 | 3 | >30 |

EXAMPLE 3

Maleic anhydride/crotonic acid copolymers

These were made according to the general method in yields of 70–80%. They had the following activities towards CaCO₃ and CaSO₄ after hydrolysis with water:

| Molar Ratio MA/ | CaCO$_3$ activity | | CaSO$_4$ activity | |
|---|---|---|---|---|
| Crotonic Acid | I.T. (mins) | Rate | I.T. (mins) | Rate |
| 7:1 | 6 | 0.2 | 4½ | >30 |
| 14:1 | 6 | 0.3 | 4 | >30 |
| 29:1 | 7 | 0.2 | 4 | >30 |
| Blank | 1 | 8 | 3 | >30 |

The maleic acid copolymer thus has a high activity towards CaCO$_3$ and only a marginal activity towards CaSO$_4$.

EXAMPLE 4

Maleic anhydride/ethyl acrylate copolymers

These were prepared by the general method in yields of 75–90%. The 3:1 copolymer had a molecular weight of 560. Following aqueous hydrolysis, they had the following activites towards CaCO$_3$ and CaSO$_4$:

| Molar Ratio MA/EAc | CaCO$_3$ activity | | CaSO$_4$ activity | |
|---|---|---|---|---|
| | I.T. (mins) | Rate | I.T. (mins) | Rate |
| 3:1 | 4 | 0.4 | 3 | >30 |
| 7:1 | 3 | 0.15 | 3 | >30 |
| 14:1 | 5 | 0.3 | 3 | >30 |
| 29:1 | 6½ | 0.3 | 3 | >30 |
| Blank | 1 | 8 | 3 | >30 | and following sodium hydroxide hydrolysis, these activities were shown below:

Hydrolyzed with sodium hydroxide

| Molar Ratio MA/EAc | CaCO$_3$ activity | | CaSO$_4$ activity | |
|---|---|---|---|---|
| | I.T. (mins) | Rate | I.T. (mins) | Rate |
| 3:1 | 3 | 0.3 | 9 | >30 |
| 7:1 | 4 | 0.3 | 12 | >30 |
| 14:1 | 3 | 0.2 | 11 | 4 |
| 29:1 | 4 | 0.4 | 10 | 9 |
| Blank | 1 | 8 | 3 | >30 |

Thus, maleic anhydride/ethyl acrylate copolymers which have been hydrolyzed with sodium hydroxide have good activity towards CaSO$_4$.

EXAMPLE 5

Maleic anhydride/styrene copolymers

These were prepared by the general method in yields of 75–80%. They were hydrolyzed with water and neutralized with sodium hydroxide prior to testing. The molecular weight of the 3:1 co-polymer was 738.

| Molar Ratio of MA/Styrene | CaCO$_3$ activity | | CaSO$_4$ activity | |
|---|---|---|---|---|
| | I.T. (mins) | Rate | I.T. (mins) | Rate |
| 3:1 | 1 | 4.0 | 4 | >30 |
| 7:1 | 5 | 0.8 | 3 | >30 |
| 14:1 | 5 | 0.8 | 3 | >30 |
| 29:1 | 5 | 0.5 | 3 | >30 |
| Blank | 1 | 8 | 3 | >30 |

These copolymers have high threshold activity towards CaCO$_3$, but are inactive towards CaSO$_4$.

EXAMPLE 6

Maleic anhydride/acrylamide copolymer

These were prepared by the general method in yields of 75–85%. The 29:1 copolymer precipitated as a resin whereas the other copolymers precipitated as powders. After hydrolysis with sodium hydroxide, they had the following threshold activities:

| Molar Ratio MA/Acrylamide | CaCO$_3$ activity | | CaSO$_4$ activity | |
|---|---|---|---|---|
| | I.T. (mins) | Rate | I.T. (mins) | Rate |
| 3:1 | 5 | 0.5 | 8 | >30 |
| 7:1 | 5 | 0.3 | 11 | >30 |
| 14:1 | 5 | 0.4 | 11 | >30 |
| 29:1 | 6 | 0.3 | 10 | >30 |
| Blank | 1 | 8 | 3 | >30 |

Thus, sodium hydroxide hydrolyzed maleic anhydride acrylamide copolymers have higher activity towards CaSO$_4$ than homopolymaleic acid and equivalent activity towards CaCO$_3$.

EXAMPLE 7

Maleic anhydride/methyl vinyl ketone copolymers

These were prepared by the general method outlined above in yields of 70–80%. The 3:1 copolymer had a molecular weight of 440. Following hydrolysis with water, they had the following threshold activities:

| Molar Ratio MA/ Methyl Vinyl Ketone | CaCO$_3$ activity | | CaSO$_4$ activity | |
|---|---|---|---|---|
| | I.T. (mins) | Rate | I.T. (mins) | Rate |
| 3:1 | 4 | 0.6 | 5 | >30 |
| 7:1 | 6 | 0.6 | 4 | >30 |
| 14:1 | 8 | 0.6 | 3 | >30 |
| 29:1 | 5 | 0.6 | 5 | >30 |
| Blank | 1 | 8 | 3 | >30 |

Hence, only a slight activity towards calcium sulphate was demonstrated by certain maleic anhydride/methyl vinyl ketone copolymers. They all, however, exhibited a similar activity towards CaCO$_3$ as polymaleic acid.

EXAMPLE 8

Maleic anhydride/methyl methacrylate copolymers

Those were prepared by the general method outlined above in yields of 75–80%. The 3:1 copolymer had a molecular weight of 510. After hydrolysis with water they had the following activities:

| Molar Ratio MA/ Methyl Methacrylate | CaCO$_3$ activity | | CaSO$_4$ activity | |
|---|---|---|---|---|
| | I.T. (mins) | Rate | I.T. (mins) | Rate |
| 3:1 | 3½ | 0.3 | 3 | >30 |
| 7:1 | 5 | 0.2 | 3 | >30 |
| 14:1 | 6 | 0.6 | 3 | >30 |
| 29:1 | 5 | 0.3 | 3 | >30 |
| Blank | 1 | 8 | 3 | >30 | and after sodium hydroxide hydrolysis, they had the following activities:

| Molar Ratio MA/ Methyl Methacrylate | CaCO$_3$ activity | | CaSO$_4$ activity | |
|---|---|---|---|---|
| | I.T. (mins) | Rate | I.T. (mins) | Rate |
| 3:1 | 3 | 0.5 | 7 | >30 |
| 7:1 | 3 | 0.6 | 8 | 6 |
| 14:1 | 5 | 0.4 | 9 | 6 |
| 29:1 | 3½ | 0.3 | 10 | 4 |
| Blank | 1 | 8 | 3 | >30 |

Thus, the sodium hydroxide hydrolyzed copolymers show good activity towards $CaSO_4$. All the copolymers exhibit activity towards calcium carbonate.

EXAMPLE 9

Maleic Anhydride/vinyl acetate copolymer

These were prepared by the general method outlined above and the 3:1 co-polymer had a molecular weight of 657. After hydrolysis with water they exhibited the following threshold properties:

| Molar Ratio MA/ Vinyl acetate | $CaCO_3$ activity | | $CaSO_4$ activity | |
| --- | --- | --- | --- | --- |
| | I.T. (mins) | Rate | I.T. (mins) | Rate |
| 3:1 | 5 | 0.7 | 8 | 6 |
| 7:1 | 5 | 0.4 | 5 | >30 |
| 14:1 | 5 | 0.7 | 5 | >30 |
| 29:1 | 7 | 0.6 | 5 | >30 |
| Blank | 1 | 8 | 3 | >30 |

After sodium hydroxide hydrolysis, the copolymers showed an improved activity towards $CaSO_4$ as shown below:

| Molar Ratio MA/ Vinyl acetate | $CaCO_3$ activity | | $CaSO_4$ activity | |
| --- | --- | --- | --- | --- |
| | I.T. (mins) | Rate | I.T. (mins) | Rate |
| 3:1 | 5 | 2 | 8 | 2 |
| 7:1 | 6½ | 0.5 | 13 | 9 |
| 14:1 | 7 | 0.6 | 13 | >30 |
| 29:1 | 5 | 0.6 | 10 | >30 |
| Blank | 1 | 8 | 3 | >30 |

EXAMPLE 10

Maleic anhydride/acrolein copolymers

These were prepared by the general method outlined above and hydrolyzed with water. Their threshold values were as follows:

| Molar Ratio MA/ Acrolein | $CaCO_3$ activity | | $CaSO_4$ activity | |
| --- | --- | --- | --- | --- |
| | I.T. (mins) | Rate | I.T. (mins) | Rate |
| 3:1 | 10 | 0.9 | 3 | >30 |
| 7:1 | 4 | 0.8 | 3 | >30 |
| 14:1 | 4 | 0.8 | 3 | >30 |
| 29:1 | 5 | 0.8 | 5 | >30 |
| Blank | 1 | 8 | 3 | >30 |

The copolymers of maleic acid and acrolein showed high $CaCO_3$ activity, but had no activity towards $CaSO_4$.

EXAMPLE 11

Several 3:1 maleic anhydride/vinyl acetate copolymers were prepared by the general method outlined above, but with different amounts of benzoyl peroxide. The yields, molecular weights of the resins and threshold results after hydrolysis with water are shown below:

| Weight of Benzoyl peroxide catalyst paste (gms.) | Yield % | Mol. weight | $CaCO_3$ activity | | $CaSO_4$ activity | |
| --- | --- | --- | --- | --- | --- | --- |
| | | | I.T. | Rate | I.T. | Rate |
| 8.6 | 84 | 400 | 5 | 0.2 | 7 | 2 |
| 4.3 | 92 | 475 | 5 | 0.3 | 7 | 2 |
| 2.15 | 80 | 400 | 5 | 0.1 | 7 | 3 |
| 1.07 | 75 | 440 | 5 | 0.8 | 8 | 2 |
| 0.54 | 67 | 330 | 4 | 0.3 | 8 | 2 |
| Blank | | | 1 | 8 | 3 | >30 |

The catalyst concentration affected the yield of copolymer, but had little influence over the level of calcium carbonate and calcium sulphate activities.

EXAMPLE 12

Preparation and use of a 3:1 molar ratio maleic anhydride/vinyl acetate copolymer in a small test boiler 73.5 parts by weight of maleic anhydride and 21.4 parts by weight of vinyl acetate were dissolved in 240 parts by volume of xylene and heated to 70° C. 4.5 parts by weight of ditertiary butyl peroxide in 20 parts by volume of xylene were added and the reaction mixture was heated to 130° C. and maintained at this temperature for 3 hours. A brown resin precipitated, which on cooling solidified, and was easily separated from the bulk of the xylene by decantation. Yield = 87% (on weight of monomers). The number average molecular weight of the polymer by vapour phase osmometry was found to be 675.

After aqueous and sodium hydroxide hydrolysis, the following results on threshold tests were obtained.

| | $CaCO_3$ | | $CaSO_4$ | |
| --- | --- | --- | --- | --- |
| | I.T. (mins) | Rate | I.T. (mins) | Rate |
| After aqueous hydrolysis | 7 | 0.3 | 3 | >30 |
| After sodium hydroxide | 5 | 1.6 | 9 | 5 |
| Blank (no polymer addition) | 1 | 8 | 3 | >30 |

The water hydrolyzed resin was tested for activity against alkaline scale in a laboratory experimental boiler, steaming at 150 p.s.i.g. Four mild steel sheaths, three of which contain 1 Kw electric cartridge heaters permanently switched on, are screwed through the boiler base plates, so that they are in the vertical position. Thermocouples are brazed into the surface of each of the four sheaths, the unheated sheath acting as a reference, to monitor any temperature changes of the surfaces due to scale formation.

The boiler was fed with a natural water with 300 ppm total hardness (expressed as $CaCO_3$). It was run continuously at 150 p.s.i.g. for a period of 500 hours, during which time the water was allowed to concentrate by a factor of 30 and thereafter maintained constant by removing concentrate in the form of a blowdown. Routine water analyses were carried out daily. At the end of a test the heater sheaths were removed, and the weight and thickness scale recorded; the average temperature increase of the heater sheath surfaces during steaming was recorded.

The following results reveal the advantageous effect of the product of the invention. They also show that it may safely be used with other conventional water treatment chemicals:

| Treatment | Conc. in feed water in (ppm) | Scaling rate | Wt. of scale (grams) | Thickness of scale (inches) | Temperature rise |
|---|---|---|---|---|---|
| Na₂CO₃ | 230 | 0.9 | 5.3 | 0.010 | 57° F |
| Condensation product of Naphthalene sulphonic acid and formaldehyde | 35 | | | | |
| Na₂CO₃ | 230 | | | | |
| Condensation product of Naphthalene sulphonic acid and formaldehyde. | 10 | <0.1 | 0.1 | 0 | <10° F |
| Hydrolyzed homo-polymaleic anhydride | 3 | | | | |
| Na₂CO₃ | 230 | | | | |
| Condensation product of Naphthalene sulphonic acid and formaldehyde | 10 | 0 | 0 | 0 | <10° F |
| Product of Example 12 after aqueous hydrolysis | 3 | | | | |
| None | — | | 14.7 | 0.030 | 110° F |

EXAMPLE 13

Preparation of a 9:2:1 molar ratio terpolymer of maleic anhydride, vinyl acetate and ethyl acrylate 117.6 parts by weight maleic anhydride, dissolved in 320 parts by volume of xylene, were heated to 143° C. A solution comprising 13.2 parts by weight ethyl acrylate, 22.8 parts by weight vinyl acetate and 5.2 parts by weight ditertiary butyl peroxide in 160 parts by volume xylene was maintained at 20° C. and added to the stirred maleic anhydride solution at 140°–145° C. over 1½ hours. Heating and stirring were continued for a further 1½ hours prior to cooling, pouring off the xylene solution from the solid resin, and superficially drying the latter in a vacuum oven at 50° C. A yield of 160 grams of resin was obtained.

100 parts by weight of this resin was boiled with 300 parts of distilled water for 1 hour under reflux and the solution then distilled to remove traces of xylene. A solution of 100 parts by weight of sodium hydroxide in 200 parts of water was added and refluxing continued for 2 hours. The excess of sodium hydroxide was neutralised by adding concentrated hydrochloric acid solution until a pH value of 10 was attained. The following threshold values were recorded:

| | CaCO₃ activity | | CaSO₄ activity | |
|---|---|---|---|---|
| | I.T. (mins) | Rate | I.T. (mins) | Rate |
| Resin of Example 13 | 5 | 0.5 | 13 | 5.4 |
| Blank | 1 | 8 | 3 | >30 |

Thus, the hydrolyzed polymer has good threshold activity for calcium sulphate.

EXAMPLE 14

Preparation of a 6:1:1 molar ratio terpolymer of maleic anhydride, vinyl acetate and ethyl acrylate 294 parts by weight of maleic anhydride dissolved in 300 parts by weight of xylene were heated to reflux terperature with stirring. A solution comprising:
  43 parts by weight of vinyl acetate
  50 parts by weight of ethyl acrylate
  5 parts by weight of ditertiary butyl peroxide, and
  150 parts by weight of xylene
was maintained at 20° C. and added over a 2 hour period to the refluxing maleic anhydride solution. Stirring and refluxing were continued for a further 4 hours. The temperature was reduced to 120° C. and the lower resin layer transferred to a separate vessel containing water at 80° C. The resin and water were stirred and residual xylene removed by distillation. During this part of the process the resin dissolved. Depending upon the type of hydrolysis required, the resin solution was treated in three different ways.

Polymer 14A — Water hydrolyzed

After boiling with water the solids content was adjusted to 50% w/w. Yield of 50% solution = 798 parts by weight.

Polymer 14B — Alkali hydrolyzed

Sufficient 50% sodium hydroxide solution was added to raise the pH of the resin solution to 10. The temperature was maintained at 80°–90° C. for 2 hours. During this time more sodium hydroxide solution was added to maintain the pH at 10. After cooling to 20° C. the solids content was adjusted to 50% w/w. Yield of 50% solution = 1000 parts by weight.

Polymer 14C — Acid hydrolyzed

The water was removed by distillation. 800 parts by weight of 47% w/w hydrobromic acid solution were added and the ensuing solution distilled slowly for two hours. At the end of this time the remaining hydrobromic acid was removed by distillation under reduced pressure. The resin was taken up in water, neutralized to pH 10 with sodium hydroxide solution and the solids content adjusted to 50% w/w. Yield of 50% solution = 1000 parts by weight.

The excellent scale inhibiting activities of the maleic anhydride/vinyl acetate/ethylate terpolymer are demonstrated by means of:
  (a) Threshold test
  (b) Laboratory boiler test
  (c) Sea water evaporator rig test
  a. Threshold Test Values

| Additive | CaCO$_3$ I.T (mins) | Rate | CaSO$_4$ I.T (mins) | Rate |
|---|---|---|---|---|
| Polymer 14A | 5 | 0.5 | 8 | 4 |
| Polymer 14B | 3 | 1.9 | 8 | 3 |
| Polymer 14C | 3 | 1.0 | 10 | 2 |
| Blank (No Polymer) | 1 | 8 | 3 | >30 | b. Laboratory boiler test

The antiscaling activity was measured in the experimental boiler described in Example 12 using the same procedure described therein.

The results obtained were as follows:

| Treatment | Conc. in Feed water in (ppm) | Scaling rate | Wt. of scale (grams) | Thickness of scale (inches) | Temperature rise |
|---|---|---|---|---|---|
| Na$_2$CO$_3$ | 230 | 0 | 0.5 | 0.002 | <10° F |
| Condensation product of Naphthalene sulphonic acid and formaldehyde | 10 | | | | |
| Polymer 14A | 1 | | | | |
| None | — | — | 14.7 | 0.03 | 110° F | c. Antiscaling activity in sea water evaporator rig

The antiscaling activity of the polymers in sea water evaporators was assessed in the following way:

Sea water containing the additive was passed at a rate of 10 liters/day through a test cell. Steam was passed into the cell through an aluminum/brass U-tube to maintain the temperature at 220° F. and air was blown into the cell to agitate its contents and facilitate decomposition of the bicarbonate ion in the sea water. After 14 days, the cell was stripped, and any scale deposited on the U-tube and cell walls scraped off and weighed.

The tube scale rate and total scale rate were then assessed. These values are derived from the following relationships:

$$\text{Tube scale rate} = \frac{\text{Weight of material deposited on U tube}}{\text{Total volume of water passing through cell}}$$

$$\text{Total scale rate} = \frac{\text{Total wt. of solids deposited in cell}}{\text{Total volume of water passing through cell}}$$

The following results were obtained with a concentration of 5 ppm (solid) polymer in the feed water:

| Additive | Scaling Rate in mgms/litre Tube | Total |
|---|---|---|
| Polymer 14A | 1.2 | 34.0 |
| Polymer 14B | 1.4 | 34.1 |
| None | 16.6 | 46.0 |

EXAMPLE 15

The excellent threshold activity of the maleic anhydride/vinyl acetate/ethyl acrylate terpolymer towards calcium sulphate at room temperature is illustrated by the following test:

The aluminum stub is immersed in a super-saturated solution of calcium sulphate, containing 1750 ppm Ca$^{2+}$, at 20° C. Crystallization occurs on the stub and on the walls and base of the vessel. At the end of the test period the stub is removed for examination of the crystal habit. An aliquot from the test solution is titrated with EDTA to determine residual calcium content.

The following results were obtained:

| Additive | Additive Concn. (p.p.m.) | Duration of Test (days) | Residual Ca$^{2+}$ (p.p.m.) |
|---|---|---|---|
| Polymer 14A | 5 | 4 | 1640 |
| Polymer 14B | 5 | 14 | 1720 |
| Polymer 14C | 5 | 30 | 1720 |
| Homopolymer of maleic anhydride | 5 | 4 | 1640 |
| " | 5 | 14 | 800 |
| " | 10 | 14 | 800 |
| None | Nil | 4 | 680 |

Thus, after 30 days the alkali hydrolyzed terpolymer of maleic anhydride/vinyl acetate/ethyl acrylate at 5 ppm concentration has superior activity to the homopolymer at 10 ppm concentration.

EXAMPLE 16

Comparative Testing

Various polymers, copolymers and terpolymers were hydrolyzed and compared at the 10 ppm level for threshold activity toward calcium carbonate and toward calcium sulphate using the test procedures given above.

| Hydrolyzed Polymer | Carbonate I.T. | Rate | Sulphate I.T. | Rate |
|---|---|---|---|---|
| Blank | 1 | 8 | 3 | >30 |
| PMA[a] | 5 | 0.6 | 3 | >30 |
| Example 13 | 5 | 0.5 | 13 | 5.4 |
| Example 14A | 5 | 0.5 | 8 | 4 |
| Copolymer 1[b] | 1 | 8 | 6 | >30 |
| Copolymer 2[c] | 5 | 0.8 | 7 | >30 |
| Copolymer 3[d] | 8 | 0.5 | 8 | >30 |
| Copolymer 4[e] | 3 | 0.3 | 8 | 0.7 |

[a]PMA is poly(maleic anhydride) hydrolyzed by water (U.S. 3,810,834);
[b]Copolymer maleic anhydride/vinyl acetate/acrylic acid (85/7.5/7.5) hydrolyzed by water (U.S. 3,755,264);
[c]Copolymer maleic anhydride/vinyl acetate (85/15) hydrolyzed by water (U.S. 3,755,264).
[d]Copolymer maleic anhydride/vinyl acetate/ethyl acrylate (85/7.5/7.5) hydrolyzed by water.
[e]Copolymer maleic anhydride/vinyl acetate/acrylic acid (80/12.5/7.5) hydrolyzed by water.

Examples 13, 14A, PMA and Copolymers 2, 3, and 4 were all very effective against calcium carbonate with only Copolymer 1 being ineffectual.

Against sulphate, however, only Examples 13 and 14A and Copolymer 4 showed good activity. Copolymers 1, 2 and 3 exhibited only slight activity against sulphate and PMA was ineffectual against sulphate.

What is claimed is:

1. A process for the prevention of the deposition of scale from water caused by scale forming materials in the water and the inhibition of corrosion which comprises adding to water 0.1 to 100 parts per million by weight of a hydrolyzed terpolymer of maleic anhydride with two ethylenically unsaturated monomers selected from the group consisting of acrylic acid, methacrylic acid, crotonic acid, itaconic acid, aconitic acid, ethyl acrylate, methyl methacrylate, other esters of said acids, acrylonitrile, acrylamide, vinyl acetate, styrene, α-methylstyrene, methyl vinyl ketone, acrolein, ethylene and propylene, the molar ratio of maleic anhydride to the sum of the moles of the other two monomers being from 2.5:1 to 5:1, the molar ratio of the two monomers to each other being from 1:1 to 2:1, and the molecular weight of the terpolymer, measured by vapor phase osmometry in methyl ethyl ketone solution, being in the range below 1000.

2. A process according to claim 1 wherein the hydrolyzed terpolymer is a terpolymer of maleic anhydride either with (a) vinyl acetate and another ethylenically unsaturated monomer selected from the group consisting of ethyl acrylate, acrylamide, methyl vinyl ketone, acrylonitrile and crotonic acid, wherein the molar ratio of vinyl acetate to the other monomer is 1:1 to 2:1, or with (b) a 1:1 molar ratio of methyl methacrylate and ethyl acrylate; or of methyl acrylate and acrolein.

3. A process according to claim 1 wherein the hydrolyzed terpolymer is a terpolymer of maleic anhydride with vinyl acetate and ethyl acrylate.

4. A process according to claim 1 wherein the amount of hydrolyzed terpolymer added to the water is from 2 to 100 parts per million by weight.

5. A process according to claim 1 in which a reactive solvent is used in the preparation of the terpolymer.

6. A process according to claim 5 in which the reactive solvent used in the preparation of the terpolymer is carbon tetrabromide, carbon tetrachloride, toluene, xylene, methyl ethyl ketone, acetone, acetic acid or ethylbenzene.

7. A process according to claim 1 in which the terpolymer is finally hydrolyzed with water.

8. A process according to claim 1 in which the terpolymer is hydrolyzed with alkali.

9. A process according to claim 1 in which the terpolymer is hydrolyzed with a mineral acid.

* * * * *